United States Patent [19]

Brackebusch

[11] Patent Number: 5,636,942

[45] Date of Patent: Jun. 10, 1997

[54] MINERAL PROCESSING TAILINGS DISPOSAL

[76] Inventor: Fred W. Brackebusch, P.O. Box 1019, Kellogg, Id. 83837

[21] Appl. No.: 592,778

[22] Filed: Jan. 26, 1996

[51] Int. Cl.$^6$ .............................. A62D 3/00; B09B 1/00; B09B 3/00
[52] U.S. Cl. ........................ 405/129; 588/252; 588/259
[58] Field of Search .................... 405/128, 129; 588/252, 259; 423/1, 28, 29, 30, 31

[56] References Cited

U.S. PATENT DOCUMENTS

| | | | |
|---|---|---|---|
| 4,468,154 | 8/1984 | Janssen et al. | 405/128 |
| 4,592,846 | 6/1986 | Metzger et al. | 405/129 X |
| 4,705,429 | 11/1987 | Natale | 405/128 |
| 4,913,585 | 4/1990 | Thompson et al. | 405/128 |
| 5,246,486 | 9/1993 | Brierley et al. | 423/29 X |
| 5,399,048 | 3/1995 | Walker | 405/129 |
| 5,463,172 | 10/1995 | Marvy | 588/252 |

OTHER PUBLICATIONS

Brackebusch, F.W., 1994, "Basics of paste backfill systems," *Mining Engineering*, pp. 1175–1178.

*Primary Examiner*—George A. Suchfield
*Attorney, Agent, or Firm*—Wells, St. John, Roberts, Gregory & Matkin, P.S.

[57] ABSTRACT

A process is disclosed for disposing mineral processing tailings. The process includes the step of treating the tailings to produce a flowable paste including a mass comprised of particles at least approximately 15% of which are less than 20 microns in diameter. The process further includes the step of preparing an unconfined ground surface tailings disposal site by grading a selected site to produce a substantially level paste receiving bed. The flowable paste is then deposited onto the paste receiving bed from a discharge station to flow by gravity to a natural angle of rest of between approximately 1° and 10° slope. The paste is allowed to consolidate from flowable to a solidified state, retaining the natural angle of rest. Overburden is then placed over the solidified paste. The process is particularly useful in ore processing using cyanidation in which cyanide destroying chemicals are used at or prior to preparation of the flowable paste.

3 Claims, 4 Drawing Sheets

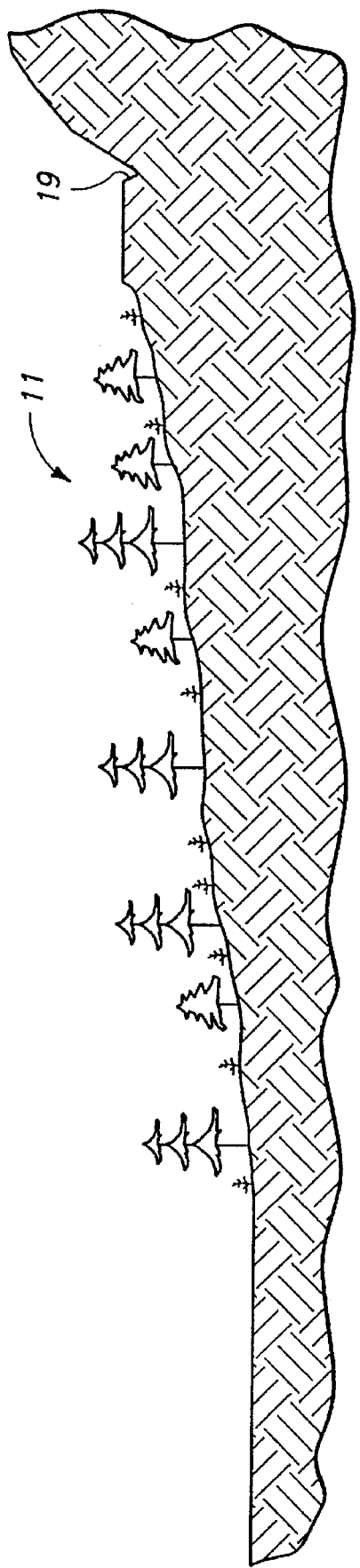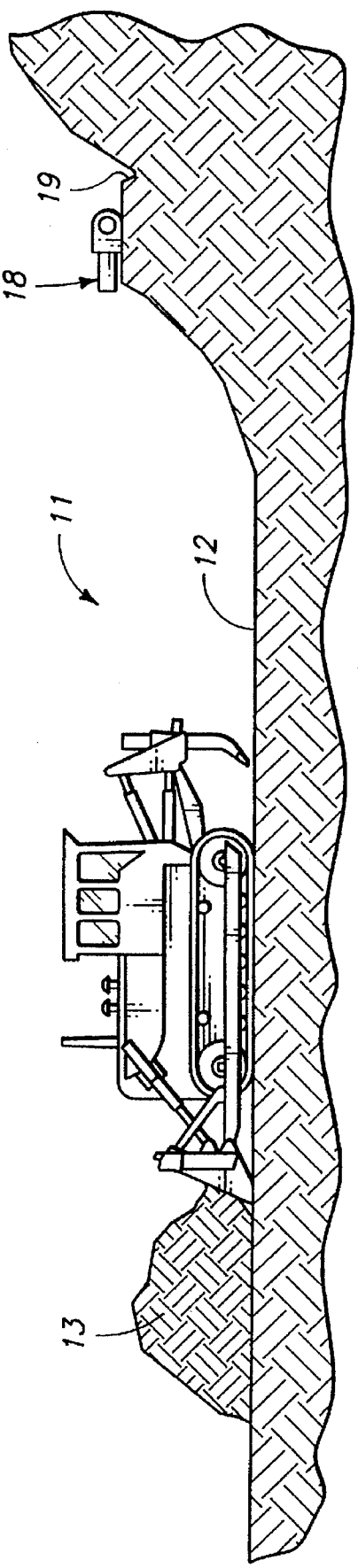

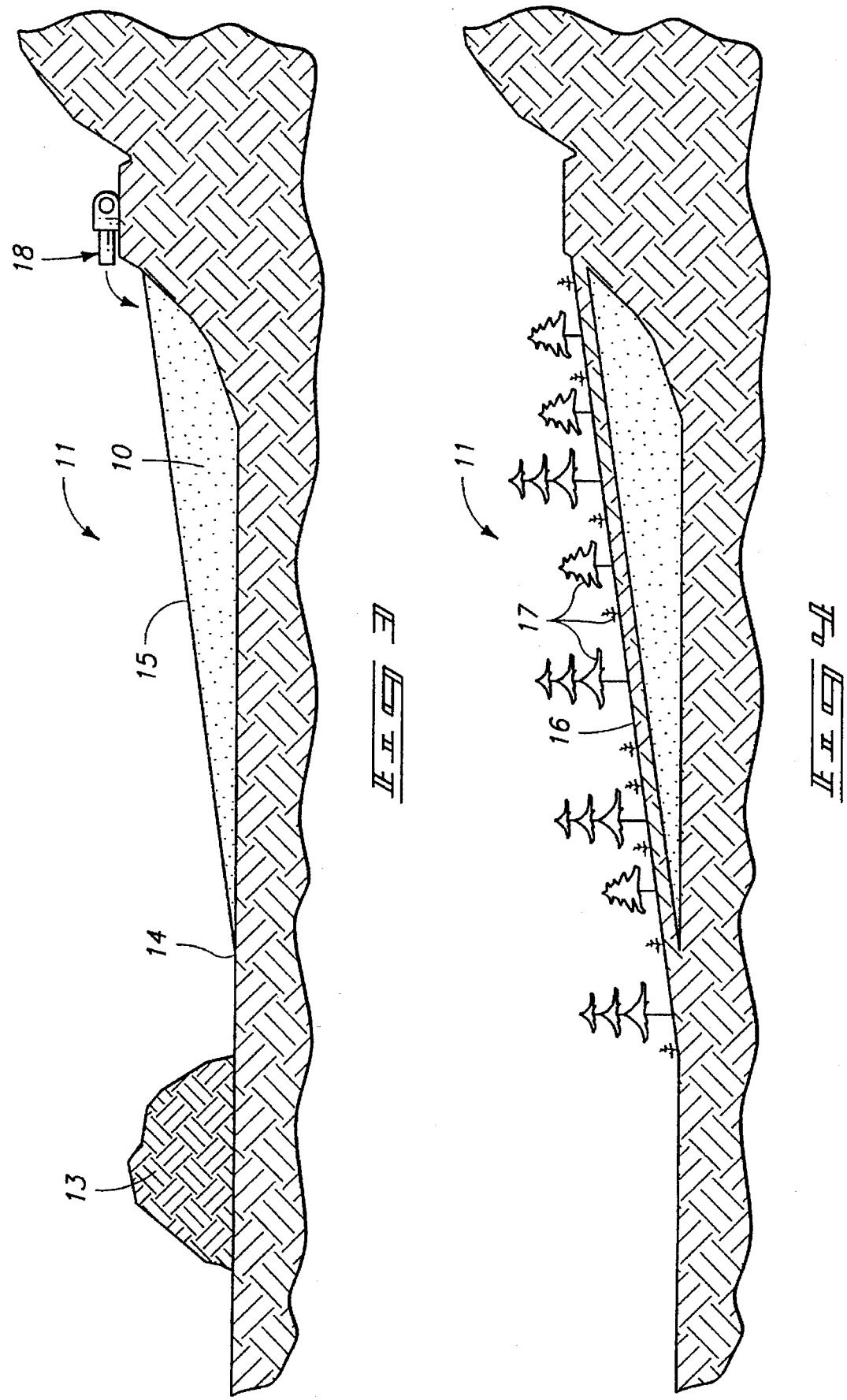

MINERAL PROCESSING TAILINGS DISPOSAL

TECHNICAL FIELD

The present invention relates to disposal of tailings from mineral processing plants, and more particularly to a process for paste deposition of mineral processing tailings in an environmentally reclaimable manner.

BACKGROUND OF THE INVENTION

Paste technology is an emerging technology, especially in the mining industry for disposal of tailings to meet environmental requirements. Instead of using elaborate and costly disposal of tailings in plastic lined basins, paste technology may be used for modification of the tailings materials to produce more favorable environmental effects.

Tailings formed in a flowable paste have been pumped to underground or underwater disposal sites. For example, U.S. Pat. No. 5,463,172 discloses disposing of hazardous industrial solid waste such as mill tailings in a water saturated area. In the disclosed process, mill tailings are formed into a flowable paste and are pumped to an excavation under a body of water. In this process, cement is mixed with the paste as a binding agent so the paste will become a hardened mass under the standing water.

While the above process appears to be functional for water saturated areas, a need remains for adequate disposal in areas which are relatively dry. The present process fills this need eliminating the need for deep water dispersion where the standing water is used as a cap. The present process further simplifies deposition of the paste by eliminating the need for special considerations to assure that the flowable paste will not mix with standing water.

BRIEF DESCRIPTION OF THE DRAWINGS

Preferred embodiments of the invention are described below with reference to the following accompanying drawings.

FIG. 1 is a diagrammatic view showing a selected tailings disposal site;

FIG. 2 is a diagrammatic view showing a prepared tailings disposal site with overburden removed and a paste receiving surface exposed;

FIG. 3 is a diagrammatic view showing deposition of paste at the prepared site at a natural angle of rest of approximately 5°;

FIG. 4 is a diagrammatic view showing the presently preferred mineral processing tailings stack following reclamation by replacing overburden over the consolidated tailings;

DETAILED DESCRIPTION OF THE PREFERRED EMBODIMENTS

Figure 5:
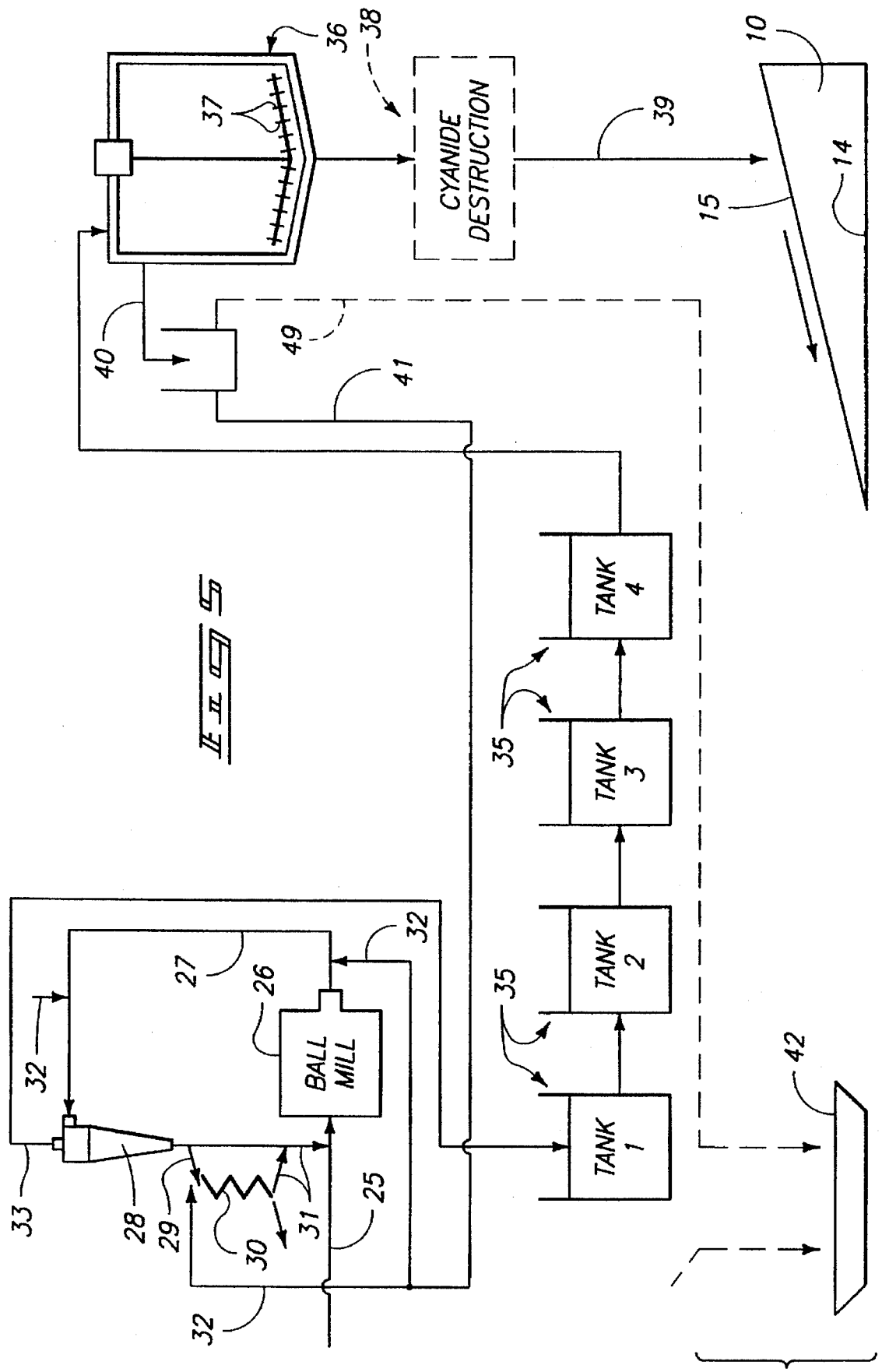
FIG. 5 is a schematic view of an ore milling operation with provisions for producing and disposing paste from tailings.

This disclosure of the invention is submitted in furtherance of the constitutional purposes of the U.S. Patent Laws "to promote the progress of science and useful arts" (Article 1, Section 8).

The following description is given primarily by way of a presently preferred example of the present process and tailings stack in an actual application in which gold is to be recovered from ore, using the Carbon-In-Leach method, termed CIL. It should be recognized however that the present process and tailing stack may be adapted by those of skill in the art to other mineral recovery and tailings disposal operations.

In general reference to the drawings, a tailings stack formed of mineral tailings is formed and reclaimed as shown in FIG. 1–4. Here, the stack is shown including tailings initially placed as a flowable paste 10 at a tailings disposal site 11. The flowable paste 10 is deposited on an unconfined ground surface that may be slightly inclined, level or contoured to present a paste receiving surface 12. Overburden 13 that may include topsoil is graded from the site 11 and left adjacent the toe 14 of the paste receiving surface 12, or alternatively may be retrieved from another location.

The paste receiving surface may be left exposed, since the paste will consolidate to a relatively impervious, hardened condition. However where regulations apply, or where the tailing site is not otherwise suitable for supporting the paste in a stable manner, various forms of conventional linings (not shown) may be applied to the surface 12 prior to deposition of the paste. In such instances, an appropriate conventional lining may be applied over the surface 12 using known accepted materials and techniques.

After the paste 10 has been deposited and allowed to consolidate at its natural angle of rest (between approximately 1° and 10° from the horizontal), the overburden is applied. This may be accomplished using an appropriate vehicle such as a bulldozer since such vehicles will be readily supported on the surface of the consolidated paste.

The overburden will be spread as a layer 16 over the inclined surface of the consolidated tailing paste at a preferred substantially uniform thickness, and at a grade or slope similar to the top surface of the consolidated paste. Reclamation may be concluded by planting or seeding to produce a reclamation growth 17 over the consolidated stack.

The tailings stack is originally formed from one or more tailing discharge stations 18 where tailings in a flowable paste 10, produced in accordance with the present process, are deposited on the prepared paste receiving surface 12. In the exemplary drawings, the discharge station 18 is situated on a prepared access road along which a diversion ditch 19 is formed for the purpose of diverting excess water runoff around the tailings disposal site 11.

In the illustrated embodiment, the discharge stations 18 will be situated such that the delivered paste will form in its natural angle of rest with the incline of the paste surface in the same direction as the adjacent hillside. This arrangement is preferred in hilly environments, but where the milling process is to be performed on relatively flat ground, it is entirely possible that the paste may be deposited from a tower (not shown) centrally located on the prepared surface for forming a relatively conical mound.

Referring now to the exemplified milling process in which the flowable tailings paste is produced, attention is drawn to FIG. 5. There a schematic drawing indicates flow of ore through a recovery process, steps of which include formation and disposition of barren mill tailings as a flowable paste to eventually form the preferred tailings stack.

As a first step, ore is fed at 25 and reduced in a grinding circuit by grinding to a fineness such that more than 65% (preferably 65% to 75%) will eventually pass through a 200 mesh screen. This step, in the example illustrated herein is performed using a ball mill 26.

Ground ore from the ball mill 26 is fed at 27 to a cyclone classifier 28 or another appropriate classifying apparatus provided in the grinding circuit to classify the ground ore.

Oversize solids will pass through a cyclone underflow 29 to a spiral or another appropriate secondary classifier 30 before re-entering the ball mill through a recycle circuit 31. The purpose of the spiral concentrator in the present example is to recover coarse gold in a gravity concentrate which will be produced for sale or leached on site. Dilution water and makeup water is added to the cyclone feed and spiral at locations identified by numerals 32.

Cyclone overflow 33 comprising approximately 10%–50% (preferably approximately 45%) solids of which at least approximately 15% have diameters less than approximately 20 microns will be passed to leaching tanks 35. Four leaching tanks are illustrated though fewer or more may be effectively used as needed. In the example herein, the tanks will each have a capacity to hold approximately 10,000 U.S. gallons.

The classified ore slurry is progressively treated in the present example by cyanidation, particularly CIL processing, for gold dissolution. The ore slurry may be agitated in the tanks with conventional mechanical agitators (not shown). For the CIL method, carbon granules are suspended in the pulp. Sodium cyanide will be added to the pulp for gold dissolution. Oxygen may also be injected into the pulp to speed the dissolution reaction. Gold dissolution by cyanide and absorption on carbon occur simultaneously. Retention time in each tank may be approximately 6 hours.

Carbon is moved periodically to the next tank in a counter current direction. Loaded carbon may be removed from the slurry by screening. The removed gold containing product may then be treated using conventional methods to recover the gold. The leaching process leaves a barren pulp slurry including tailings still including approximately 45% solids that may be treated in the present process to form a non-Newtonian flowable paste for disposal.

In general, the barren pulp slurry is dewatered to form a flowable paste that is capable of consolidation to form a relatively strong, impervious mass at the disposal site. Preferably the paste will flow by gravity from the discharge station at the site and consolidate at a natural angle of rest of between 1° and 10°.

Preferably, the slurry is dewatered by gravity sedimentation in which the slurry is held in a tank where solids are allowed to settle to an underflow as the flowable paste.

In the present example, slurry is pumped to a dewatering station that is situated near or at the tailings stack at an elevation higher than the prepared paste receiving surface 12. In this manner, dewatering to form flowable paste is accomplished adjacent the disposal site and little if any further pumping is required to dispose of the formed, flowable paste.

Figure 6:
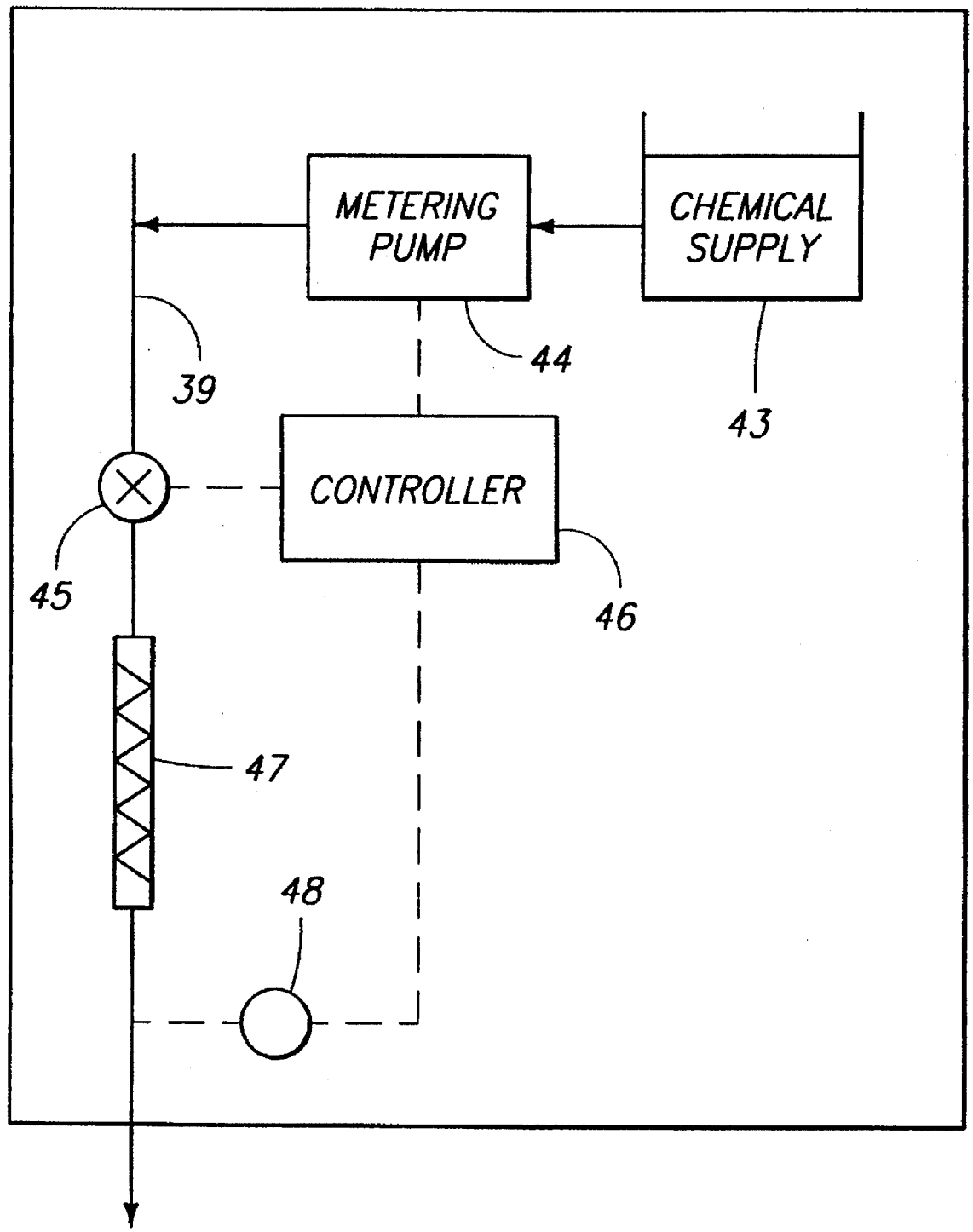
FIG. 6 is a detailed schematic view of a portion of the operation shown generally in FIG. 4.

Overflow 40 from the dewatering station may be recycled back to the leaching or grinding process. Underflow 39 will be withdrawn using a conventional pump (if needed) and flow control valve 45 (FIG. 6) and will flow by gravity or be pumped to the tailings stack.

Most preferably, the slurry is dewatered by gravity sedimentation in a high density thickener 36 in which sedimentation is enhanced using a slowly rotating rake 37 that "knifes" through the slurry during slow rotation to assist the dewatering process. As the rake blades move through the slurry, spaces temporarily formed behind the blades will fill with water, which will bleed toward the top of the thickener tank 36. This water may then be removed as overflow and returned in the circuit through a recycle line 41 to the make-up water feed 32 and spiral concentrator 30.

A preferred step in the present process is maintaining the viscosity of the paste forming in the high density thickener such that underflow paste from the high density thickener will form a natural angle of rest of between 1° and 10°. This step is primarily accomplished by monitoring the underflow and determining the residual water content of the paste which should be maintained between approximately 10% to 50%. In the exemplary process, 20% water content is preferred.

The ability of the paste to consolidate and form a solid, strong mass depends at least in part on the uniformity of settling for all ranges of particle sizes to form the paste. A conventional flocculent may be added to the thickener feed in order to assure such uniformity in the desired paste. The thickener feed may also be diluted internally to optimize flocculent performance.

Potential spills from the thickener or from other areas may be diverted to a standby impoundment 42 of conventional form. Spilled material collected in the impoundment may be recycled through the system.

In the exemplary CIL gold recovery method, cyanide destroying chemicals are added to the slurry at a selected point in the process from a chemical supply 43 (FIG. 6), using a metering pump 44 and a static mixer. This is done in order to maintain cyanide and soluble heavy metals in the water below levels needed to protect the beneficial use of ground and surface waters at the tailings disposal site.

Sodium hypochlorite (bleach) has been tested and found adequate for the exemplary process discussed herein. Caro's acid may also be useful. As a fail-safe system for cyanide destruction, Eh (oxidation reductions potential, measured in voltage) of the paste will be monitored as shown at 48 in the FIG. 6 detailed schematic. If the Eh drops below the predetermined set point, the paste valve 45 will be disabled automatically to interrupt tailings deposition.

In FIG. 5, the cyanide destruction unit 38 is shown receiving paste from the high density thickener. However, as noted above, the unit could be situated elsewhere. For example there may be reason in some applications for locating the cyanide destruction unit between the leaching tanks and high density thickener.

The use of the present process, especially the steps involving formation of the paste 10 for tailings disposal has several notable advantages.

Coarse and fine particles in paste formed in the present process do not segregate. Thus the entire tailings deposit will have the same material properties. This is in contrast to conventional dilute tailings disposal where sands are deposited near the discharge point and slimes migrate farther away to produce very liquid deposits which do not consolidate.

Paste formed in the present process is a bingham plastic fluid with shear strength. As the paste ages, the shear strength increases. The initial shear strength results in the stacking of the paste at a characteristic angle of rest depending significantly on the viscosity of the paste taken directly from the high density thickener underflow. This angle may be selectively adjusted and, due to the consistency of particulate size range throughout the paste, will remain the same during consolidation unless otherwise acted upon. Thus the paste need merely be deposited at the tailings disposal site. Freshly deposited paste will flow across the site and stop with the top surface at a consistent angle of rest and will consolidate at that angle without the aid of mechanical assistance.

As a result of the lack of particle size segregation, paste produced with the present process becomes substantially impermeable, with decreasing permeability as the paste consolidates. A test showed permeability of $4.2 \times 10^{-5}$ cm/sec after 48 hours of consolidation. During consolidation, a small relative volume of clear bleed water reports to the surface and runs off or evaporates. Capillary action brings water to the surface for additional evaporation. Lack of oxygen flow through the deposit, either dissolved in the water or in gaseous form, inhibits or prevents oxidation of sulfides except in a thin surface layer.

The paste will consolidate, even without the use of binders, to produce a deposit that will support vehicles after a short period. This enhances the option to reclaim the tailings deposit site in stages, thus limiting the amount of exposed tailings and permitting quick establishment of vegetation on the overburden.

The structural stability of the consolidated tailings in the stack is adequate based on observation of test pastes. The particles within the paste typically will be angular and will consolidate to a very hard material when subjected to light vibration. Experiments with an uncemented tailing paste show an average of 2,300 psf unconfined compressive strength in 7 days. Addition of a small amount of binder such as fly ash may be useful to further increase strength.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A process for disposing tailings in an ore treatment using cyanidation, including the steps of:

grinding the ore to a fineness such that more than 65% will pass through a 200 mesh screen;

forming an ore slurry of the ground ore containing approximately 10%–50% solids of which at least approximately 15% have diameters less than approximately 20 microns;

processing the ore slurry to separate a selected mineral by leaching with cyanide;

removing the selected mineral and leaving tailings as a barren pulp slurry;

placing the barren pulp slurry in a high density thickener and dewatering the barren pulp slurry by gravity sedimentation to form an underflow of flowable paste;

adding cyanide destroying chemicals to the tailings;

adjusting viscosity of the paste in the high density thickener such that underflow paste from the high density thickener will form a natural angle of rest of between 1° and 10°;

preparing a ground surface tailings disposal site;

depositing the underflow paste onto the tailings disposal site from a discharge station to flow by gravity to the natural angle of rest over the ground surface tailings disposal site;

consolidating the deposited paste to a solidified state; and covering the solidified paste with overburden.

2. A process for disposing tailings in an ore treatment using cyanidation as claimed by claim 1, wherein the step of adjusting the viscosity of the paste is accomplished by adding flocculent to the high density thickener.

3. A process for disposing tailings in an ore treatment using cyanidation as claimed by claim 1, wherein the step of adding cyanide destroying chemicals is performed prior to the step of placing the barren pulp slurry in the high density thickener.

* * * * *